US012768723B2

(12) United States Patent
Yoshihara et al.

(10) Patent No.: US 12,768,723 B2
(45) Date of Patent: Oct. 20, 2026

(54) TEMPERATURE SENSOR AND ROTARY ELECTRIC MACHINE

(71) Applicant: SHIBAURA ELECTRONICS CO., LTD., Saitama (JP)

(72) Inventors: Takamasa Yoshihara, Saitama (JP); Ryotaro Kamimura, Semboku (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 294 days.

(21) Appl. No.: 18/682,811

(22) PCT Filed: Apr. 14, 2023

(86) PCT No.: PCT/JP2023/015174
§ 371 (c)(1),
(2) Date: Feb. 9, 2024

(87) PCT Pub. No.: WO2024/029139
PCT Pub. Date: Feb. 8, 2024

(65) Prior Publication Data

US 2024/0280413 A1 Aug. 22, 2024

(30) Foreign Application Priority Data

Aug. 4, 2022 (JP) ................................ 2022-124509

(51) Int. Cl.
*G01K 1/14* (2021.01)
*G01K 7/22* (2006.01)
*H02K 11/25* (2016.01)

(52) U.S. Cl.
CPC ................ *G01K 1/14* (2013.01); *G01K 7/22* (2013.01); *H02K 11/25* (2016.01)

(58) Field of Classification Search
CPC .......... G01K 1/14; G01K 1/143; G01K 1/146
(Continued)

(56) References Cited

U.S. PATENT DOCUMENTS 4,355,912 A * 10/1982 Haak ........................ G01K 1/14
374/208
4,444,990 A * 4/1984 Villar ........................ G01K 7/04
374/208
(Continued)

FOREIGN PATENT DOCUMENTS

CN 112033562 A * 12/2020 ............ G01K 1/146
DE 102019208076 A1 12/2020
(Continued)

OTHER PUBLICATIONS

Translation of WO2021070898A1.*
(Continued)

*Primary Examiner* — Mirellys Jagan
(74) *Attorney, Agent, or Firm* — McDonald Hopkins LLC

(57) ABSTRACT

There are provided a temperature sensor in which a thermosensitive portion can be stably brought into contact with a temperature measurement object without requiring addition of an elastic body such as a spring, and a rotary electric machine including the temperature sensor. A temperature sensor includes: a thermosensitive portion including a thermosensitive element and a covering body made of a resin and covering the thermosensitive element; lead wires electrically connected to the thermosensitive element and drawn out from the covering body in one direction; and a holder configured to house and hold parts of the lead wires in an inside of the holder. The thermosensitive portion is held by the lead wires to be displaceable at least in the one direction relative to the holder.

10 Claims, 10 Drawing Sheets

(58) Field of Classification Search
USPC .................................................. 374/208, 141
See application file for complete search history.

(56) References Cited

U.S. PATENT DOCUMENTS

| | | | | |
|---|---|---|---|---|
| 4,770,545 | A * | 9/1988 | Takada ................... | G01K 1/146 374/185 |
| 2009/0147826 | A1 * | 6/2009 | Suzuki ..................... | G01K 1/08 374/208 |
| 2009/0296782 | A1 * | 12/2009 | Nishiyashiki ............ | G01K 1/14 374/208 |
| 2010/0244857 | A1 | 9/2010 | Nakamura et al. | |
| 2020/0033196 | A1 * | 1/2020 | Tanaka ................ | H01M 10/486 |
| 2021/0223113 | A1 * | 7/2021 | Pecquet ................... | G01K 1/08 |
| 2022/0320971 | A1 | 10/2022 | Akaba et al. | |

FOREIGN PATENT DOCUMENTS

| | | | | | |
|---|---|---|---|---|---|
| JP | 60080731 | A | * | 5/1985 | |
| JP | S63-75419 | A | | 4/1988 | |
| JP | 2010-223830 | A | | 10/2010 | |
| JP | 2011-027466 | A | | 2/2011 | |
| JP | 2013-137233 | A | | 7/2013 | |
| JP | 5807811 | B2 | * | 11/2015 | .......... H01M 10/486 |
| JP | WO2021-070898 | A1 | | 11/2021 | |
| KR | 20110138899 | A | * | 12/2011 | ............... G01K 7/02 |
| WO | WO-2021070898 | A1 | * | 4/2021 | ............. H02K 11/25 |

OTHER PUBLICATIONS

Translation of CN112033562A.*
Translation of JP5807811B2.*
International Search Report dated Jun. 13, 2023 issued in PCT/JP2023/015174.
Written Opinion dated Jun. 13, 2023 issued in PCT/JP2023/015174.

* cited by examiner

TEMPERATURE SENSOR AND ROTARY ELECTRIC MACHINE

TECHNICAL FIELD

The present invention relates to a temperature sensor and a rotary electric machine including the temperature sensor.

BACKGROUND ART

A temperature sensor generally includes a thermosensitive element that comes into contact with a temperature measurement object to detect a temperature, and lead wires connected to the thermosensitive element. For example, a temperature sensor disclosed in Patent Literature 1 includes a thermosensitive element, lead wires, a covering body covering a whole of the thermosensitive element and a predetermined range of the lead wires, and a housing holding the covering body and the lead wires. To detect a temperature of a coil of a stator in a rotary electric machine mounted on a vehicle, the covering body of the temperature sensor is inserted into a gap between coil wires. In the gap, the covering body is deflected to come into tight contact with the coil.

CITATION LIST

Patent Literature

Patent Literature 1: WO 2021/070898

SUMMARY OF INVENTION

Technical Problem

The temperature sensor is preferably installed on an appropriate support member in a state of being in contact with the temperature measurement object at proper pressure. However, each of the temperature sensor and the temperature measurement object has a tolerance of a dimensional shape. In a case where a relative distance between the temperature sensor and the temperature measurement object is largely varied due to the tolerances, it is difficult to stably bring the temperature sensor into contact with the temperature measurement object.

As an example, a case where a front end part of the covering body of the temperature sensor disclosed in Patent Literature 1 is abutted on and brought into contact with a surface of the temperature measurement object is supposed. In such a case, the tolerances can be absorbed to a certain extent by deflection displacement of the covering body. However, if the tolerances cannot be sufficiently absorbed by maximum deflection of the covering body due to the small distance between the temperature sensor and the temperature measurement object, the temperature sensor cannot be installed, or excessive stress occurs on the temperature sensor even when the temperature sensor can be installed. In contrast, when the temperature sensor and the temperature measurement object are apart from each other and do not come into contact with each other, the temperature sensor cannot properly detect the temperature of the temperature measurement object.

Therefore, it is considered that the temperature sensor is pressed against the temperature measurement object by using an elastic body such as a metal spring, and a displacement amount corresponding to the tolerances of the temperature measurement object and the temperature sensor is secured by elastic force of the spring. However, adding the spring member increases the cost of the temperature sensor.

Under such circumstances, an object of the present disclosure is to provide a temperature sensor in which a thermosensitive portion can be stably brought into contact with a temperature measurement object without requiring addition of an elastic body such as a spring member.

Solution to Problem

A temperature sensor according to the present invention includes: a thermosensitive portion including a thermosensitive element and a covering body made of a resin and covering the thermosensitive element; an electric wire electrically connected to the thermosensitive element and drawn out from the covering body in one direction; and a holder configured to house and hold a part of the electric wire in an inside of the holder. The thermosensitive portion is held by the electric wire to be displaceable at least in the one direction relative to the holder.

A rotary electric machine according to the present invention includes: a stator including a core and a coil; a rotor configured to rotate relative to the stator; and the above-described temperature sensor configured to detect a temperature of the coil.

Advantageous Effects of Invention

According to the present invention, even when the relative distance between the holder and the temperature measurement object is varied, it is possible to stably bring the thermosensitive portion into contact with the temperature measurement object because the thermosensitive portion is held by the electric wire so as to be displaceable in the one direction in which the electric wire is drawn out from the covering body.

DESCRIPTION OF EMBODIMENTS

Figure 1A:
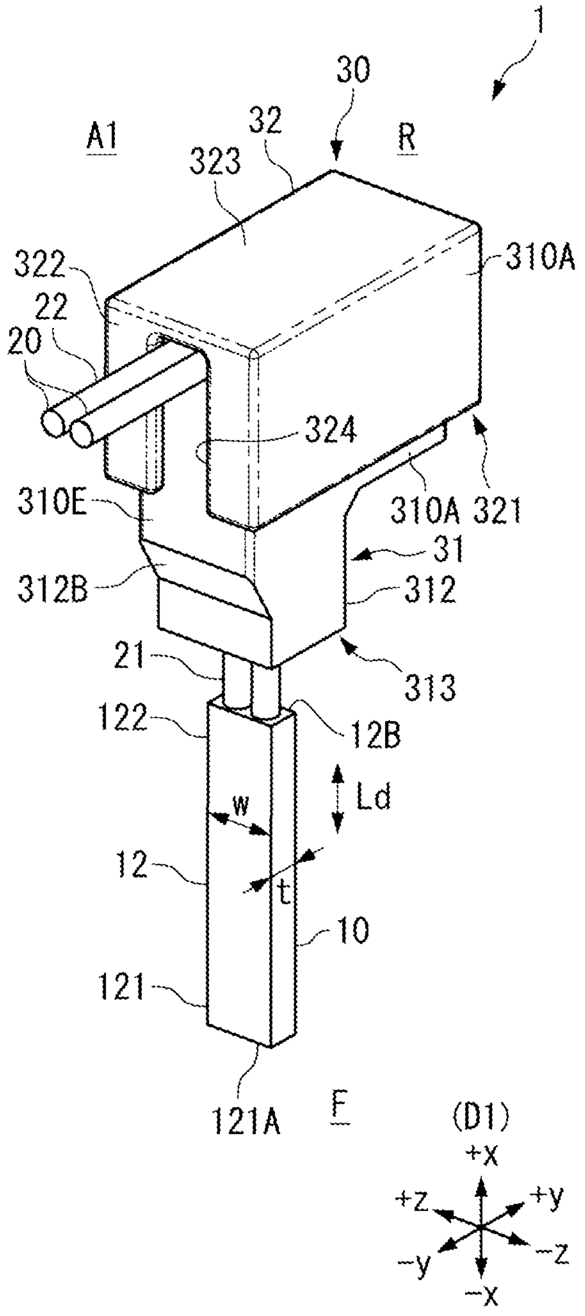
FIGS. 1A and 1B are perspective views illustrating a temperature sensor according to a first embodiment, FIG. 1B illustrating an inside of a holder that is partially cut away.

Embodiments of the present invention will be described below with reference to accompanying drawings.

First Embodiment

[Entire Configuration]

A temperature sensor 1 illustrated in FIG. 1A to FIG. 3 includes a thermosensitive element 11, lead wires 20 as paired electric wires connected to the thermosensitive element 11, a covering body 12 covering a whole of the thermosensitive element 11 and parts of the lead wires 20, and a holder 30 internally housing and holding predetermined regions of the lead wires 20 extending from the covering body 12. In the following, a structure including the covering body 12 and an inside thereof is referred to as a "thermosensitive portion 10".

The temperature sensor 1 is provided on, for example, a stator (not illustrated) of a rotary electric machine mounted on a vehicle, and detects a temperature of a temperature measurement object 9 (FIG. 2B) as a stator coil.

The temperature sensor 1 is used while the thermosensitive portion 10 is brought into contact with the temperature measurement object 9. A direction in which the thermosensitive portion 10 comes into contact with the temperature measurement object 9 is referred to as an x direction. In the drawings, an orthogonal coordinate system is represented by the x direction, a y direction, and a z direction.

In the x direction, a side on which the thermosensitive portion 10 of the temperature sensor 1 is disposed is referred to as "front side", and a side on which the lead wires 20 extend from the thermosensitive portion 10 is referred to as "rear side". In the drawings, "F" denotes the front side, and "R" denotes the rear side.

[Thermosensitive Element]

Figure 1B:
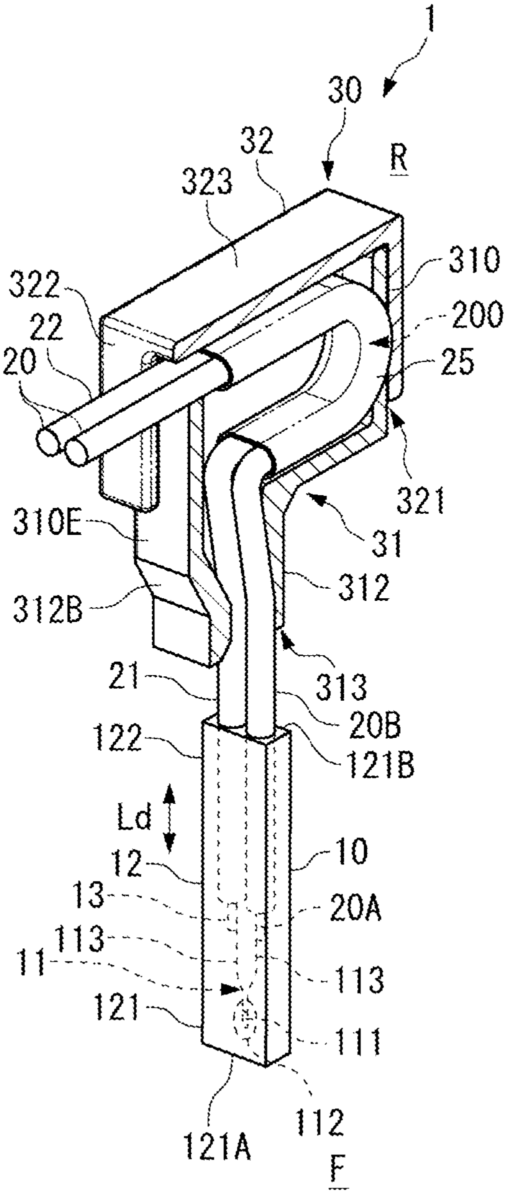

As illustrated in FIG. 1B, the thermosensitive element 11 includes a thermosensitive body 111 having an electric resistance variable to temperature change, an insulation sealing material 112 covering the thermosensitive body 111, and paired clad wires 113 (extraction wires) electrically connected to the thermosensitive body 111 and drawn out from the sealing material 112. The thermosensitive body 111 corresponds to, for example, a thermistor. The clad wires 113 correspond to, for example, Dumet wires. The paired clad wires 113 are drawn out in the same direction.

[Lead Wire]

The paired lead wires are individually connected to the paired clad wires 113, extend in the direction same as the extending direction of the paired clad wires 113, and are drawn out from the covering body 12 in one direction. A direction in which the paired lead wires 20 are drawn out from the covering body 12 is referred to as one direction D1. The one direction D1 corresponds to a +x direction in FIG. 1B and other drawings.

Each of the paired lead wires 20 may be a twisted pair wire. In the illustrated example, the paired lead wires 20 are arranged side by side in the z direction; however, the present invention is not limited thereto.

Each of the lead wires 20 includes a core wire 20A joined to the corresponding clad wire 113, and an insulation coating 20B coating the core wire 20A. The paired lead wires 20 are connected to an unillustrated temperature detection circuit.

Each of the paired lead wires 20 includes a bent region 200. The bent regions 200 are bent in advance in the same shape and are elastically deformable in the x direction. The bent regions 200 are formed in a predetermined shape by receiving a load from fingers, a tool, or the like. The bent regions 200 are housed inside the holder 30.

Each of the paired lead wires 20 includes, in addition to the bent region 200, a first region 21 extending from the thermosensitive portion 10 to the bent region 200, and a second region 22 extending from the bent region 200 and drawn out to the outside of the holder 30.

The first region 21 includes a first section 211 and a second section 212. The first section 211 extends from the covering body 12 in parallel to the x direction. The second section 212 extends from the first section 211 to the bent region 200 in a state of being slightly inclined toward −y side from the x direction.

The second region 22 extends in a direction (y direction) orthogonal to the first section 211 of the first region 21.

The paired lead wires 20 are bent along an xy plane as a whole including the first regions 21, the bent regions 200, and the second regions 22.

Figure 2A:
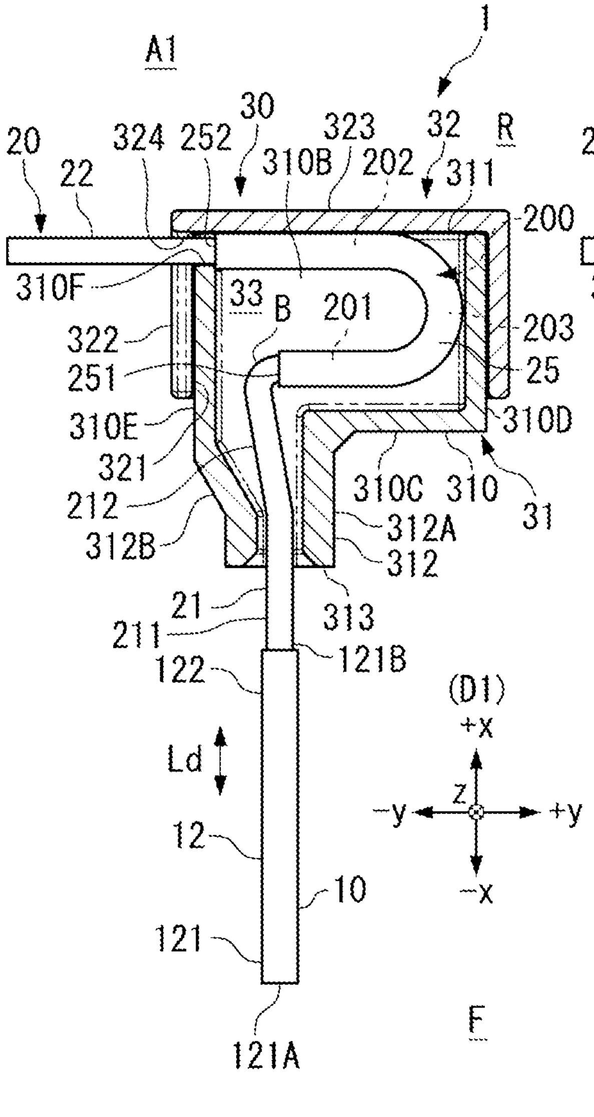
FIGS. 2A and 2B are partial cutaway side views illustrating the temperature sensor illustrated in FIGS. 1A and 1B, FIG. 2A illustrating an initial state of bent regions of lead wires, and FIG. 2B illustrating a state where the bent regions of the lead wires are elastically deformed.
Figure 3:
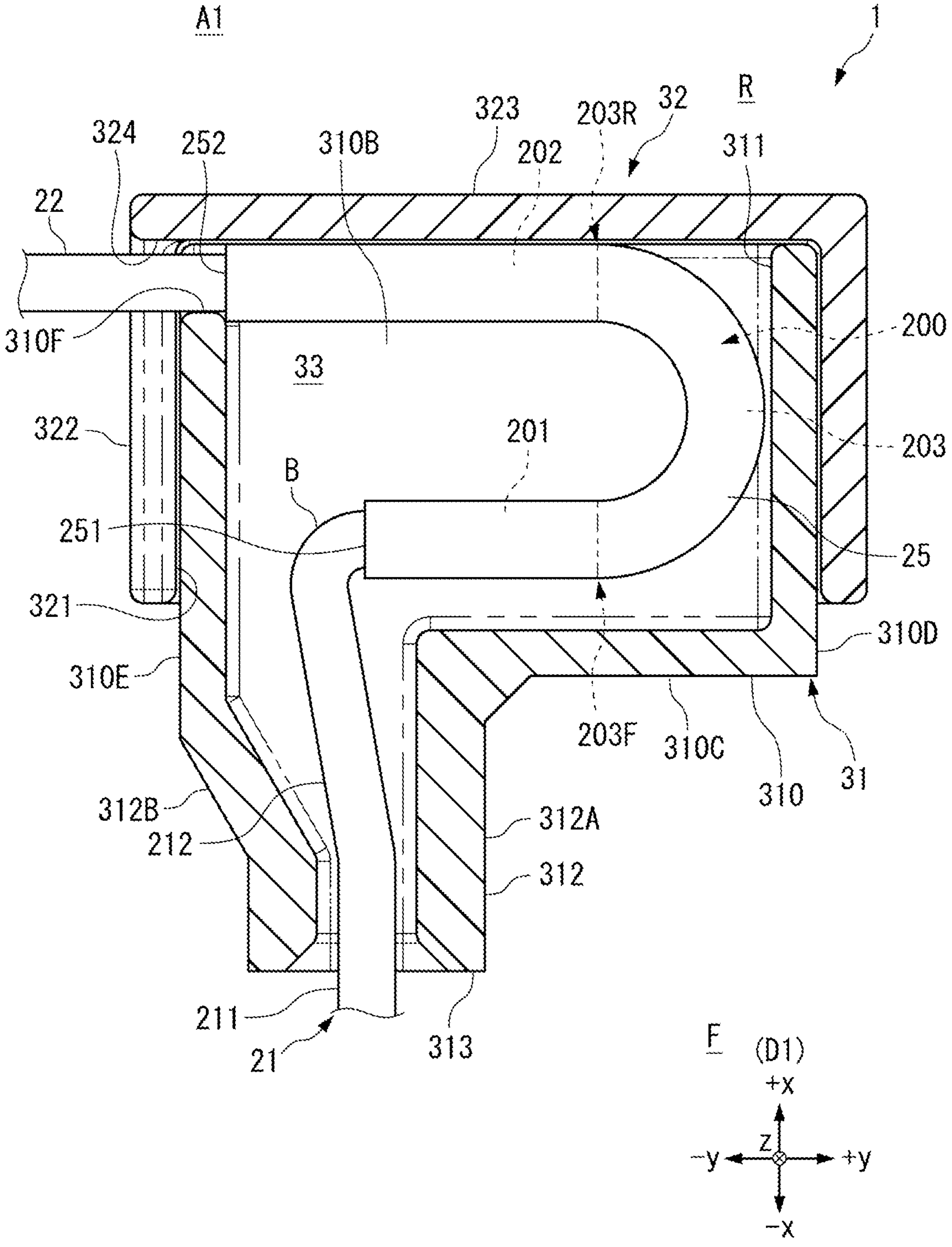
FIG. 3 is an enlarged view of the bent regions of the lead wires.

FIG. 2A and FIG. 3 illustrate a state before the temperature sensor 1 mounted on an unillustrated support member is brought into contact with the temperature measurement object 9, namely, a state where no load is applied to the temperature sensor 1 (initial state A1). At this time, the bent regions 200 are each maintained in a shape curved in a U-shape.

Each of the bent regions 200 includes a first facing portion 201, a second facing portion 202, and a curved portion 203 connecting the first facing portion 201 and the second facing portion 202, and forms a U-shape as a whole. The curved portion 203 is curved in an arc shape protruding in a +y direction.

The first facing portion 201 is bent in the +y direction to be approximately orthogonal to the first region 21. The second facing portion 202 is folded back from the first facing portion 201 in the −y direction through the curved portion 203, and communicates with the second region 22. The first facing portion 201 and the second facing portion 202 are arranged to face each other in the x direction, and both linearly extend.

A radius of curvature of the curved portion 203 is greater than a radius of curvature of a part where the first facing portion 201 is bent relative to the second section 212 of the first region 21.

As described below, the curved portion 203 can be obtained by two means.

The curved portion 203 can be obtained by bend forming the lead wire 20 in a straight state. The bent region 200 formed by the bend forming can maintain the curved shape without receiving external force. In contrast, when external force is applied to the bent region 200, the bent region 200 cannot maintain the curved shape. This is referred to as a first form of the bent region 200.

Further, the curved portion 203 can be obtained only by bending the lead wire 20 in the straight state, other than the bend forming. In this case, when a second holder 32 is detached from a first holder 31 from the state illustrated in FIG. 2A, the bent region 200 can return to the straight state. This is referred to as a second form of the bent region 200. In the second form, the shape is maintained by receiving external force. In the present embodiment, both of the first form and the second form are applicable.

Since the bent region 200 includes the curved portion 203, the first facing portion 201 can be deflected in the x direction by elastic deformation of the curved portion 203 from the initial state A1 that is the state before the temperature sensor 1 is installed. By the deflection, a front end of the first facing portion 201 apart from the curved portion 203 comes close to an end part 252 of the second facing portion 202. At this time, a load F0 is generated on the first facing portion 201 in an upward direction in the drawing. The load F0 is generated when the thermosensitive portion 10 is pressed toward the rear side R (in one direction D1) by the temperature measurement object 9. Note that, in the first facing portion 201, a side close to a bent part B is defined as the front end, and a side connected to the curved portion 203 is defined as a rear end.

Figure 2B:
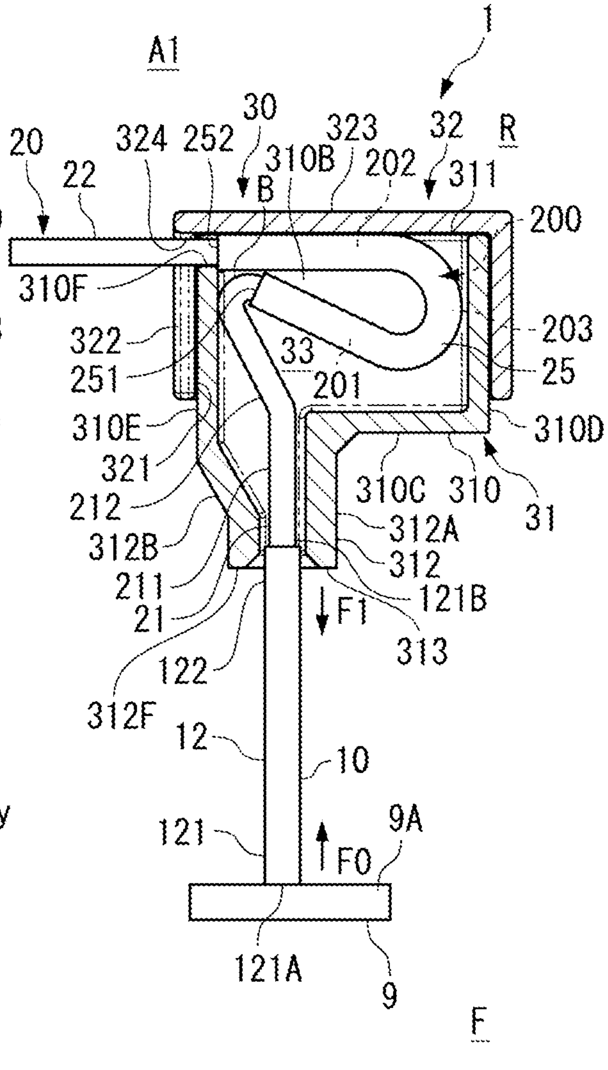

As the curved portion 203 elastically deforms, the bent part B formed by the first region 21 and the first facing portion 201 comes close to the second facing portion 202 and the first region 21 is drawn into the holder 30 as illustrated in FIG. 2B. At this time, the bent part B and the first region 21 are displaced in the +x direction by, for example, a displacement amount xd. Because of such elastic deformation of the bent region 200, a load F1 occurs in a direction in which the bent region 200 is restored to the initial state A1.

[Tube]

A tube 25 as a rigidity adding portion is provided in a predetermined range of the paired lead wires 20 including the bent regions 200. The tube 25 is provided around the paired lead wires 20 to enhance rigidity of the predetermined range. Providing the tube 25 on the lead wires 20 makes it possible to obtain combined rigidity of the lead wires 20 and rigidity of the tube 25 as a whole of the lead wires 20 and the tube 25.

The tube 25 is bent in a shape similar to the shape of the bent regions 200 by a load applied to the tube 25 and the paired lead wires 20 inserted into the tube 25.

Since the bent regions 200 are inserted into the tube 25, the tube 25 is held by the lead wires 20. The load F1 can be increased by improvement in rigidity of the bent regions 200 by the tube 25.

Note that the tube 25 may be individually provided on each of the paired lead wires 20.

A material of the tube 25 is appropriately selectable in consideration of an elastic module, heat resistance required for the temperature sensor 1, and the like. The tube 25 can be made of an appropriate material and may have appropriate diameter, thickness, shape, and the like as long as the tube 25 does not inhibit forming of the bent regions 200, is deformable at elastic deformation of the bent regions 200, and contributes to addition of rigidity to the lead wires 20. A gap may be provided or may not be provided between an inner peripheral portion of the tube 25 and an outer peripheral portion of each of the lead wires 20.

The tube 25 according to the present embodiment corresponds to a tube that is made of an elastic material such as fluorine rubber and silicone rubber, has a circular cross-section, and is formed in a linear shape. Fluorine rubber corresponds to, for example, tetrafluoroethylene-perfluoroalkylvinylether copolymer (PFA), or polytetrafluoroethylene (PTFE).

To sufficiently obtain the load F1, the tube 25 is preferably provided over a range including at least the whole of the curved portions 203 of the bent regions 200.

The tube 25 according to the present embodiment is provided from a position beyond front ends 203F of the curved portions 203 to the first region 21 side to a position beyond rear ends 203R of the curved portions 203 to the second region 22 side. Therefore, even if the tube 25 is slightly displaced from the curved portions 203 when the lead wires 20 are inserted into the tube 25 and the tube 25 is disposed at the curved portions 203, or when the lead wires 20 and the tube 25 are shaped in bent shapes, the entire curved portions 203 can be covered with the tube 25. After the lead wires 20 and the tube 25 are shaped, positional displacement of the lead wires 20 and the tube 25 is regulated by friction between the lead wires 20 and the tube 25 in the curved portions 203.

An end part 251 of the tube 25 on the first region 21 side and an end part 252 on the second region 22 side are both positioned inside the holder 30.

The end part 251 on the first regions 21 side may be at an appropriate position beyond the front ends 203F of the curved portions 203 to the first region 21 side. In the illustrated example, the end part 251 is at a position on the first facing portions 201 side of the bent parts B in the vicinity of the bent parts B; however, the end part 251 may be at a position beyond the bent parts B to the first regions 21 side.

A position of the end part 252 of the tube 25 is set to a position in the vicinity of parts of the lead wires 20 penetrating through the holder 30.

[Covering Body]

The covering body 12 protects the thermosensitive element 11 and joint portions 13 of the thermosensitive element 11 and the lead wires 20, from external force. As illustrated in FIGS. 1A and 1B, the covering body 12 is formed in a long shape long in a direction in which the clad wires 113 are drawn out from the sealing material 112. A longitudinal direction of the covering body 12 is denoted by Ld. The covering body 12 extends more rearward than the joint portion 13, and covers the lead wires 20 over a predetermined length.

A width w of the covering body 12 is slightly greater than a total dimension of paired lead wires 20 in the z direction. A thickness t of the covering body 12 is slightly greater than an outer diameter of a single lead wire 20.

The covering body 12 includes a first region 121 positioned on one end side in the longitudinal direction Ld, and a second region 122 positioned on the other end side in the longitudinal direction Ld. The thermosensitive body 111 is disposed in the vicinity of a front end part 121A of the first region 121.

The front end part 121A of the first region 121 comes into contact with the temperature measurement object 9. The longitudinal direction Ld of the covering body 12 is coincident with the x direction, and the first sections 211 of the first regions 21 of the lead wires 20 extending rearward from the covering body 12 also extend in the x direction.

The covering body 12 according to the present embodiment is formed to have a rectangular parallelepiped outer shape. The covering body 12 has a rectangular cross-section from the first region 121 to the second region 122. A shape of the cross-section of the covering body 12 is not limited to the rectangular shape, and may be an optional shape, for example, a circular shape. In addition, a shape of a part of the covering body 12 in the longitudinal direction Ld may be different from a shape of the other part. For example, the first region 121 may be formed thinner than the second region 122.

The covering body 12 according to the present embodiment can be made of an insulation elastic material such as fluorine rubber and silicone rubber.

As an example, the thermosensitive element 11 and the lead wires 20 are inserted into a tube made of PTFE, and the tube is contracted by heating and is put in a mold followed by pressurization. This makes it possible to provide the covering body 12 on the thermosensitive element 11 and the lead wires 20. The thermosensitive portion 10 is fabricated by covering the thermosensitive element 11 and the lead wires 20 with the covering body 12 in the above-described manner. Bend forming of the lead wires 20 exposed from the covering body 12 and the tube 25 may be performed before or after fabrication of the thermosensitive portion 10.

As a material of the covering body 12, in addition to fluorine rubber and silicon rubber, an appropriate elastic material such as natural rubber, isoprene rubber, styrene-butadiene rubber, butadiene rubber, chloroprene rubber, butyl rubber, ethylene-propylene rubber, ethylene-vinyl acetate copolymer, chlorosulfonated polyethylene, chlorinated polyethylene, epichlorohydrin rubber, nitrile butadiene rubber, nitrile isoprene rubber, and acrylic rubber can be used in consideration of necessary heat resistance.

The above-described materials can be used for the tube 25.

The materials of the covering body 12 and the tube 25 are not limited to the elastic materials, and the covering body 12 and the tube 25 can be made of appropriate resin materials, for example, polyphenylene sulfide (PPS), polyphenylene sulfide (PPS), polyamide (PA), polyimide (PI), polyetheretherketone (PEEK), polytetrafluoroethylene (PTFE), polysulfone (PSF/PSU), polyetherimide (PEI), polycarbonate (PC), polypropylene (PP), polyvinylidene chloride (PVDC), polyacetal (POM), polyvinylidene fluoride (PVDF), perfluoroalkoxy alkane (PFA), phenol resin (PF), unsaturated polyester (UP), epoxy resin (EP), silicone resin (SI), and polyurethane (PU).

[Holder]

As illustrated in FIG. 3, the holder 30 includes the first holder 31 and the second holder 32. The first holder 31 and the second holder 32 are each made of an insulation resin material by injection molding. The bent regions 200 of the lead wires 20 are housed in a space 33 inside the first holder 31 and the second holder 32. As the space 33, a volume sufficient to house the bent regions 200 in the initial state A1 and to allow contraction and displacement of the bent regions 200 is secured.

The holder 30 includes an unillustrated fixed portion fixed to an unillustrated support member. When the fixed portion is fixed to the support member, the temperature sensor 1 is disposed at a predetermined position.

The first holder 31 includes a substantially box-shaped housing portion 310 including a rectangular opening 311 on the rear side R, a square-cylindrical guide portion 312 protruding from the housing portion 310 to the front side F, and a lead wire insertion portion 313 positioned at a front end of the guide portion 312. The guide portion 312 and the lead wire insertion portion 313 are positioned on the −y side of the housing portion 310.

The housing portion 310 includes paired side walls 310A and 310B facing each other in the z direction, a bottom 310C facing the opening 311, a wall 310D that is disposed on the +y side of the side walls 310A and 310B and communicates with the bottom 310C, and a wall 310E that is disposed on the −y side of the side walls 310A and 310B and communicates with the guide portion 312. The wall 310E on the −y side includes a notch 310F recessed from a rear end to the front side F.

The guide portion 312 extends in the x direction while surrounding the first regions 21 of the lead wires 20. A wall 312A of the guide portion 312 on the +y side extends along an xz plane. A wall 312B of the guide portion 312 on the −y side is inclined to the xz plane such that an opening area is reduced toward the lead wire insertion portion 313.

The lead wire insertion portion 313 includes a rectangular opening into which the first regions 21 of the lead wires 20 are inserted. An opening area of the lead wire insertion portion 313 is increased toward the front side F. When elastic deformation of the curved portions 203 is increased as illustrated in FIG. 2B, the bent parts B abut on the second facing portions 202, and elastic deformation of the curved portions 203 reaches a maximum and is stopped. In other words, the covering body 12 cannot move to the rear side R any further.

The guide portion 312 may extend more forward than a position of a front end 312F in the present embodiment. In this case, the guide portion 312 can guide the covering body 12 in the x direction.

The second holder 32 is formed in a box shape including a rectangular opening 321 on the front side F. A side wall 322 of the second holder 32 on the −y side includes a notch 324 into which the second regions 22 of the lead wires 20 are inserted. The second holder 32 is assembled to the first holder 31 so as to close the opening 311 of the first holder 31.

An example of a procedure of assembling the holder 30 and both of the thermosensitive portion 10 and the lead wires 20 is described.

The thermosensitive portion 10 is fabricated in advance by providing the covering body 12 on the thermosensitive element 11 and the lead wires 20. In addition, the bent regions 200 are formed in advance by bend forming at predetermined positions of the lead wires 20.

The thermosensitive portion 10 is directed to the front side F, and the thermosensitive portion 10 and the lead wires 20 communicating with the thermosensitive portion 10 are inserted into the opening 311 of the first holder 31 and housed in the housing portion 310. As a result, the bent regions 200 are disposed in the space 33, the second regions 22 are disposed in the notch 310F, and the thermosensitive portion 10 is disposed outside the first holder 31 through the lead wire insertion portion 313.

At this time, the first sections 211 of the first regions 21 are disposed in the lead wire insertion portion 313.

After the bent regions 200 are housed in the first holder 31, the housing portion 310 of the first holder 31 is put into the second holder 32. As a result, an unillustrated engagement portion of the first holder 31 and an unillustrated engagement portion of the second holder 32 engage with each other, and the first holder 31 and the second holder 32 are accordingly assembled as illustrated in FIG. 2A. The opening 311 of the first holder 31 is closed by a top wall 323 of the second holder 32. The second regions 22 of the lead wires 20 are drawn out to the outside of the holder 30 through the notch 310F of the first holder 31 and the notch 324 of the second holder 32. The end part 252 of the tube 25 is locked to the wall 310E from the inside of the holder 30 at the position of the notch 310F of the first holder 31.

States of the bent regions 200 (first facing portions 201, second facing portions 202, and curved portions 203) when the first holder 31 and the second holder 32 are assembled to each other are as illustrated in FIG. 2A.

More specifically, the second facing portions 202 of the paired lead wires 20 are in contact with the top wall 323 of the second holder 32. Therefore, displacement and deformation of the second facing portions 202 in the +x diction are constrained. The space 33 is present between the first facing portions 201 and the second facing portions 202, and the first facing portions 201 can be deflected in the space 33 such that the front ends of the first facing portions 201 come close to the second facing portions 202. The first facing portions 201 are connected to the bent regions 200, and the rear ends of the first facing portions 201 can be considered to be cantilevered by connection portions relative to the curved portions 203. Therefore, when the load F0 acts on the thermosensitive portion 10, the connection portions and the curved portions 203 are elastically deformed to deflect the first facing portions 201 upward. By deflection of the first facing portions 201, the load F1 due to the stress generated by elastic deformation is applied to the temperature measurement object 9 through the covering body 12 of the thermosensitive portion 10.

When the first holder 31 and the second holder 32 are assembled to each other, the gap between the lead wires 20 and each of the side wall 310A and the side wall 310B in the z direction is small. Therefore, the side wall 310A and the side wall 310B function as guides for the lead wires 20, and the first facing portions 201 of the lead wires 20 can be deflected while displacement in the z direction is constrained.

[Action of Temperature Sensor]

Main action of the temperature sensor 1 is described with reference to FIGS. 4A and 4B.

An actual position of the holder 30 installed on the support member is varied relative to a designed reference position. Likewise, an actual position of the temperature measurement object 9 is also varied relative to a designed reference position. Therefore, even when a relative distance between the holder 30 and the temperature measurement object 9 is varied, the thermosensitive portion 10 is held by the lead wires 20 so as to be displaceable at least in the one direction D1 (+x direction), which makes it possible to stably bring the thermosensitive portion 10 into contact with the temperature measurement object 9.

Figures 4A, 4B:
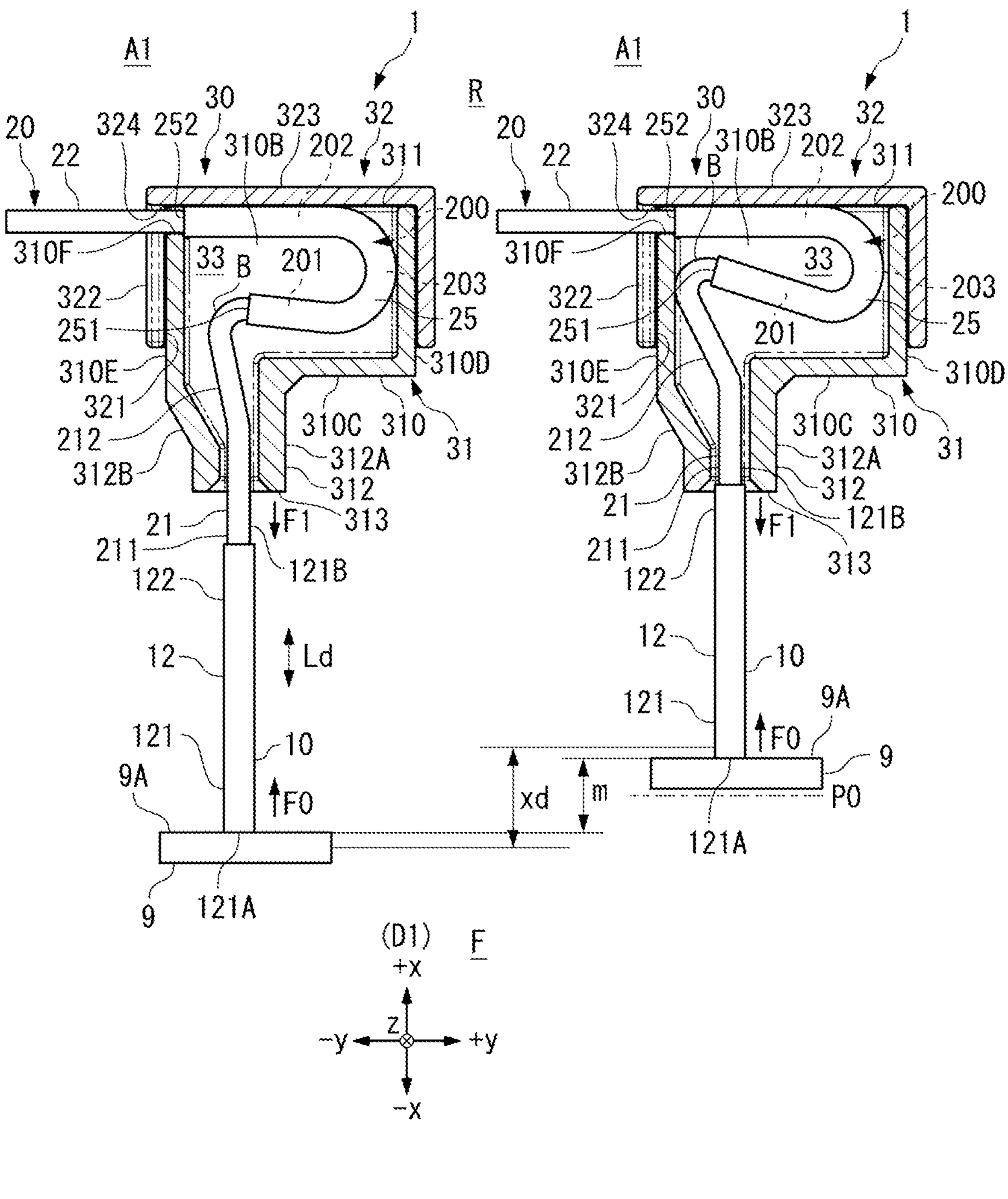
FIGS. 4A and 4B are diagrams to explain elastic deformation of the bent regions when the temperature sensor is installed.

When the first holder 31 and the second holder 32 are installed on the unillustrated support member, the thermosensitive portion 10 is held by the lead wires 20 including the first regions 21 drawn into the holder 30, so as to be displaceable within a range of the predetermined displacement amount xd in the +x direction relative to the holder 30 by the load F0 generated by pressing the thermosensitive portion 10 by the temperature measurement object 9 toward the rear side R, for example, as illustrated in FIG. 4A or 4B.

When the bent regions 200, in particular, the curved portions 203 are elastically deformed in a direction in which the first regions 21 are drawn into the holder 30, the first sections 211 of the lead wires 20 are drawn into the space 33 while being linearly guided by the wall 312A of the guide portion 312 in the one direction D1 as illustrated in FIG. 4B.

FIG. 4B illustrates a state where the curved portions 203 are elastically deformed substantially at maximum. The displacement amount xd that is greater than the maximum positional displacement amount (tolerance m) between the temperature sensor 1 and the temperature measurement object 9 is set to the thermosensitive portion 10 over the front side F and the rear side R of a designed reference position P0 of a surface 9A of the temperature measurement object 9.

For example, even in a case where the position of the surface 9A of the temperature measurement object 9 is displaced from the reference position P0 to the front side F as illustrated in FIG. 4A, no gap is formed between the temperature measurement object 9 and the thermosensitive portion 10. The bent regions 200, in particular, the curved portions 203 are elastically deformed from the initial state A1 by a small amount corresponding to the displacement amount to the front side F, as compared with a case where the temperature measurement object 9 is at the reference position P0. Along therewith, the thermosensitive portion 10 comes into contact with the surface 9A of the temperature measurement object 9 at pressure necessary for heat conduction from the temperature measurement object 9 to the thermosensitive portion 10 by the load F1 while being displaced from the position in the initial state A1 to the rear side R.

In a case where the position of the surface 9A of the temperature measurement object 9 is displaced from the reference position P0 to the rear side R as illustrated in FIG. 4B, the thermosensitive portion 10 is retracted from the temperature measurement object 9 to the rear side R, namely, in the one direction D1 mainly because of the elastic deformation of the curved portions 203. Therefore, the thermosensitive portion 10 does not interfere with the temperature measurement object 9. Thus, excessive reaction force is not generated on the thermosensitive portion 10 pushed by the temperature measurement object 9, and the thermosensitive portion 10 comes into contact with the temperature measurement object 9 at proper pressure. At this time, the load F1 is not necessarily essential for the bent regions 200.

Effects by Present Embodiment

According to the temperature sensor 1 in the present embodiment, the lead wires 20 includes the bent regions 200 having the elastic deformation amount (xd) corresponding to the tolerance m of the relative distance between the temperature measurement object 9 and the temperature sensor 1. Therefore, it is possible to stably bring the thermosensitive portion 10 into contact with the temperature measurement object 9 without requiring addition of an elastic body made of a metal such as a coil spring and a plate spring to the temperature sensor 1. Thus, as compared with a case where a metal spring member is added, it is possible to provide the temperature sensor 1 having high reliability in terms of accuracy and responsiveness of temperature detection while suppressing its cost and maintaining the small size of the temperature sensor 1.

Even when an additional member is used in order to obtain sufficient load F1, it is sufficient to adopt the tube 25 as a rigidity adding member. The tube 25 is available at low cost as compared with the metal spring member. In addition, the tube 25 can be disposed around the lead wires 20 without increasing the volume of the temperature sensor 1, and is held with the bent regions 200 of the lead wires 20 by the holder 30. Therefore, unlike a case where a spring member is added to the temperature sensor 1 with holding means, the tube 25 does not inhibit downsizing of the temperature sensor 1.

Since the load F1 is increased by the tube 25, even when external force such as vibration and impact is applied to the temperature sensor 1, the state where the thermosensitive portion 10 is stably in contact with the temperature measurement object 9 can be maintained.

In a case where an elastic material such as PFA is used for the tube 25, the tube 25 is also elastically deformed as the bent regions 200 elastically deforms. This further increases the load F1.

Increasing rigidity of the insulation coatings 20B of the lead wires 20 also achieves an effect similar to the effect achieved with the tube 25. To enhance rigidity, the thicknesses of the insulation coatings 20B may be increased or a material having higher rigidity may be used. However, enhancement in rigidity of only parts of the lead wires 20 is not realistic, and the rigidity is enhanced over the entire regions of the lead wires 20. In this case, rigidity of unnecessary portions is also enhanced, and the cost of the lead wires 20 is increased. In contrast, using the tube 25 makes it possible to enhance rigidity of only necessary portions at low cost.

As in the present embodiment using the tube 25, locking the end part 252 of the tube 25 to the wall 310E from the inside of the holder 30 makes it possible to prevent the bent regions 200 from getting out of the holder 30 to the second regions 22 side. As a result, the bent regions 200 can be retained in the predetermined shapes inside the holder 30, and the bent regions 200 are stably elastically deformed. This makes it possible to stably obtain the necessary displacement amount xd and the load F1.

Spring constants of the bent regions 200 can be changed by replacing the tube 25 with a tube different in material, diameter, or thickness. As a result, the desired load F1 can be obtained by replacement of the tube 25 while the lead wires 20 are maintained in the same structure. The temperature sensor 1 can be assembled to various products different in assembly tolerance, contact pressure, operation temperature, and the like.

Therefore, a plurality of tubes that are different in material, diameter, thickness, and the like, and satisfy necessary heat resistance are preferably prepared depending on a product. The necessary load F1 may be realized by superimposing another tube on an outer periphery of the tube.

In a case where the necessary load F1 can be obtained only by the lead wires 20, it is unnecessary to provide the tube 25 on the lead wires 20. Even in this case, to prevent the bent regions 200 from being displaced to the second region 22 side and from getting out of the holder 30, the tube 25 can be provided on the lead wires 20, and the end part 252 of the tube 25 can be locked to the holder 30. In a case where the prevention is not performed, the tube 25 may be provided over the entire lengths of the lead wires 20 including the first regions 21 and the second regions 22.

The lead wires 20 do not necessarily have to be covered up under the tube 25. For example, a single hole or a plurality of holes may be provided in a wall of the tube 25, or the tube 25 may be made of a mesh-like material.

Figure 5A:
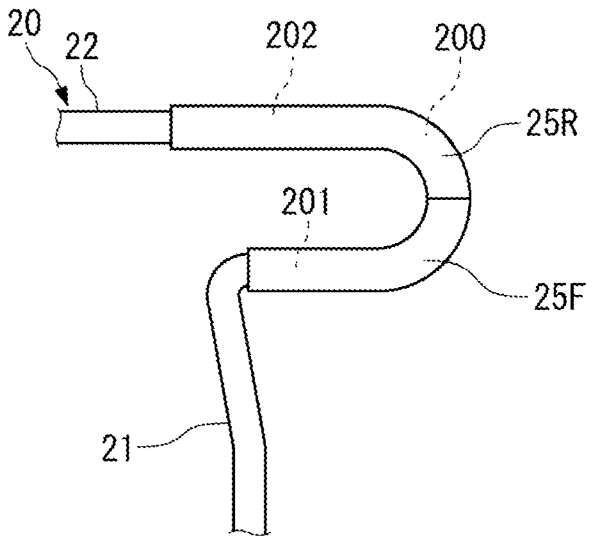
FIGS. 5A to 5C are diagrams each illustrating a modification of a tube provided on the lead wires.
Figure 5B:
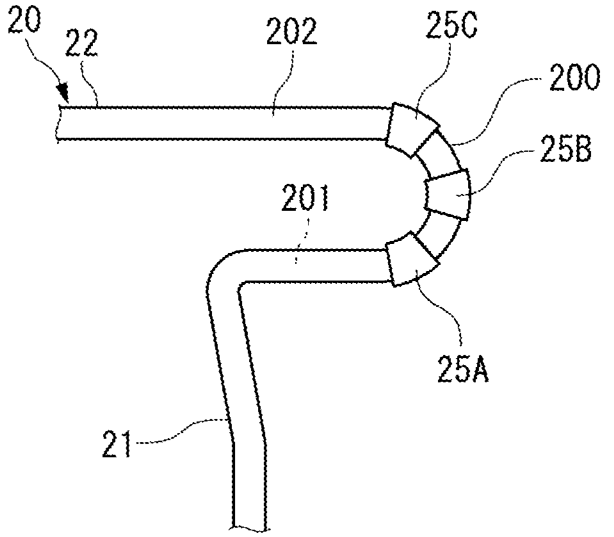

Further, even when the tube 25 is not continuously provided on the entire curved portions 203, rigidity is added to the bent regions 200. For example, the tube 25 may be divided into a portion 25F of the front side F and a portion 25R on the rear side R as illustrated in FIG. 5A, or short tubes 25A, 25B, and 25C may be dispersedly provided at a plurality of positions of the curved portions 203 as illustrated in FIG. 5B.

Figure 5C:
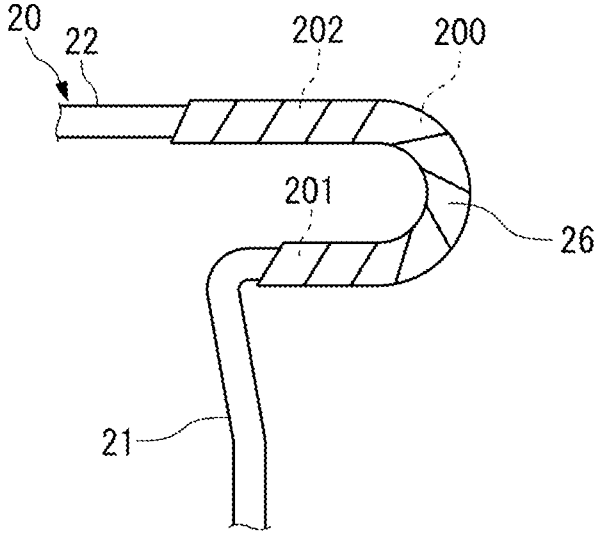

The rigidity adding portion is not necessarily the tube 25. For example, winding a tape-like member 26 around the lead wires 20 in a spiral shape as illustrated in FIG. 5C also makes it possible to add rigidity to the bent regions 200. The member 26 can be wound around the lead wires 20 before or after forming of the bent regions 200.

Since the paired lead wires 20 are arranged side by side in the z direction, the bent regions 200 can be easily formed, and appropriate elastic force can be generated. For example, if the paired lead wires 20 are arranged side by side in the y direction, rigidity is excessively high, and the bent regions 200 cannot be easily formed and are hardly elastically deformed.

Modifications of First Embodiment

Figure 6A:
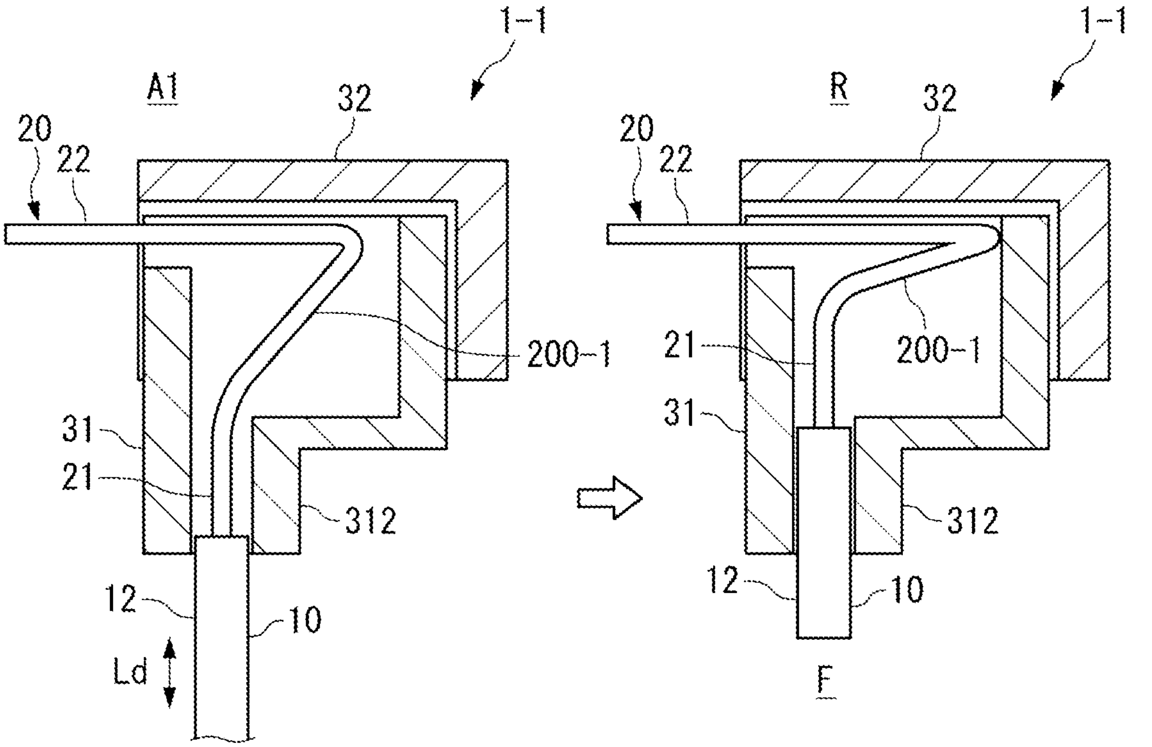
FIG. 6A is a schematic side view illustrating a temperature sensor according to a first modification of the first embodiment.
Figure 6B:
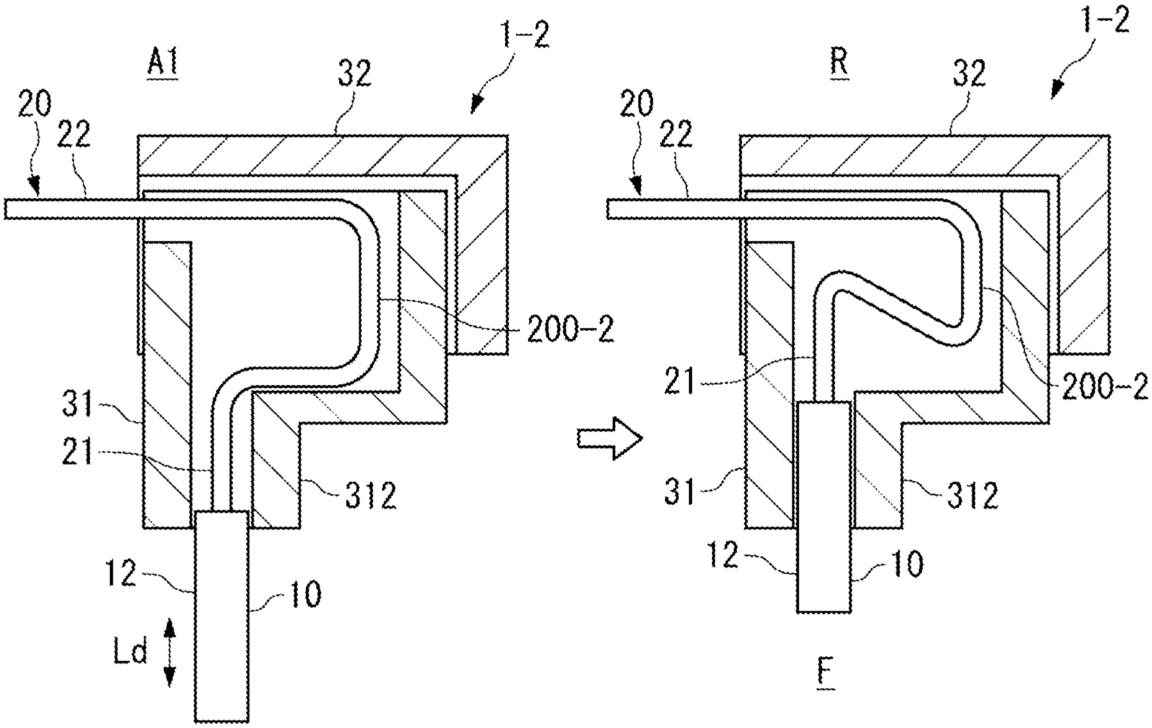
FIG. 6B is a schematic view illustrating a temperature sensor according to a second modification of the first embodiment.
Figure 7:
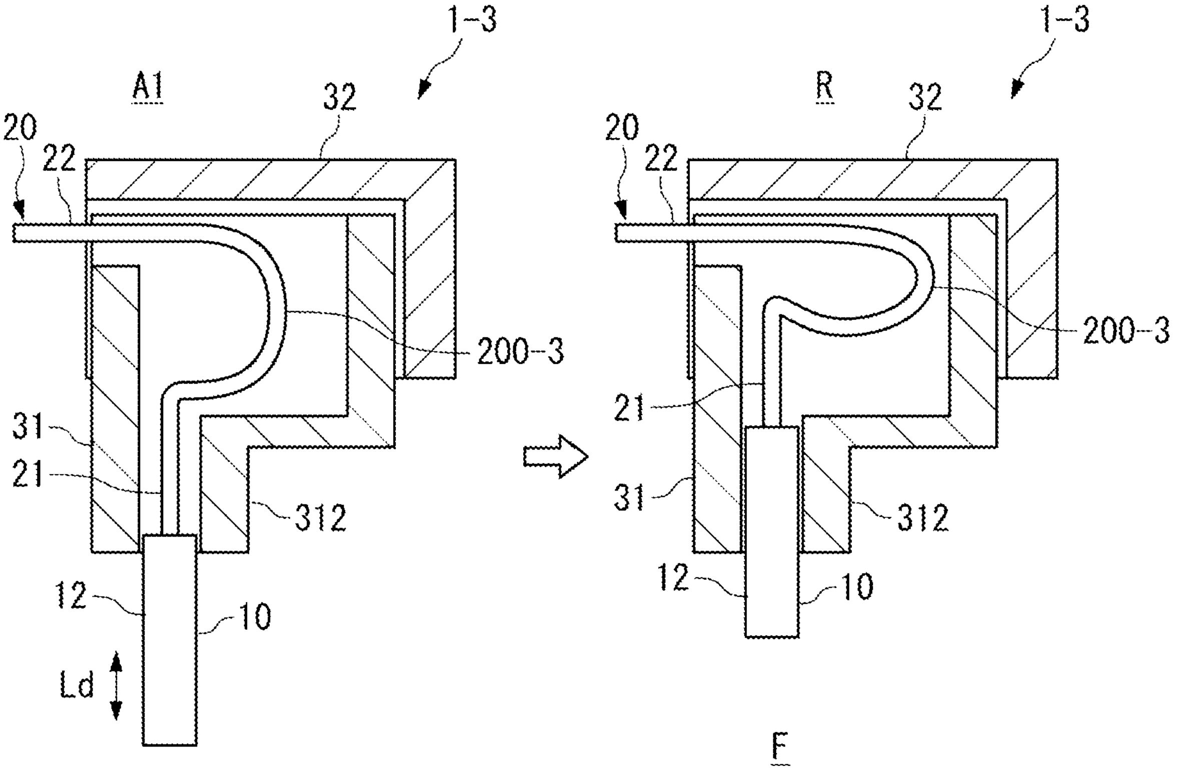
FIG. 7 is a schematic view illustrating a temperature sensor according to a third modification of the first embodiment.

FIG. 6A, FIG. 6B and FIG. 7 illustrate temperature sensors 1-1, 1-2, and 1-3 that are modifications of the temperature sensor 1 according to the above-described first embodiment. In any of FIG. 6A, FIG. 6B, and FIG. 7, the initial state A1 is illustrated on a left side, and a state where the bent regions are elastically deformed is illustrated on a right side.

Bent regions 200-1, 200-2, and 200-3 provided in the respective modifications are different in shapes from the bent regions 200 according to the first embodiment, but are elastically deformed to the rear side R by the load F0 generated by pressing the thermosensitive portion 10 to the rear side R, as with the bent regions 200 according to the first embodiment.

Therefore, based on the relative distance between the temperature measurement object 9 and the holder 30, the thermosensitive portion 10 is displaced relative to the holder 30 through the lead wires 20 in which the bent regions 200-1, 200-2, or 200-3 are elastically deformed. This makes it possible to stably bring the thermosensitive portion 10 into contact with the temperature measurement object 9.

In second to fourth embodiments described below, the bent regions are elastically deformed by the load F0 generated by pressing the thermosensitive portion 10. Along with elastic deformation of the bent regions, the thermosensitive portion 10 is displaced relative to the holder. Thus, it is possible to stably bring the thermosensitive portion 10 into contact with the temperature measurement object 9.

In the following, elements similar to the elements described above are denoted by the same reference numerals.

Second Embodiment

Figure 8A:
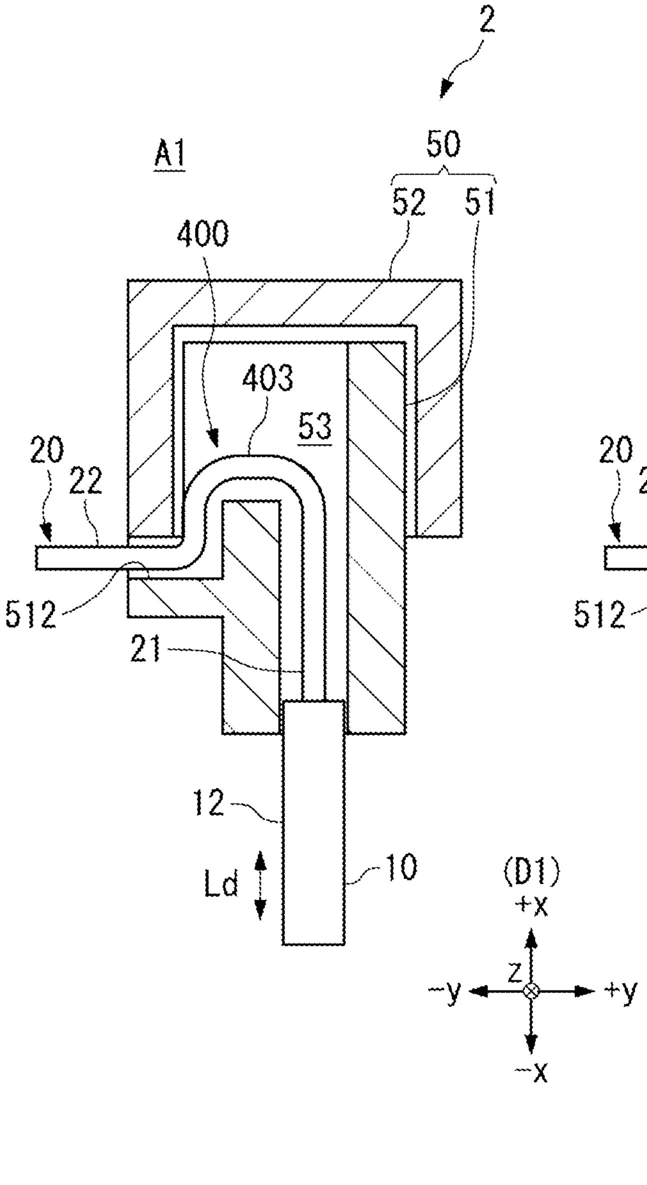
FIGS. 8A and 8B are schematic views illustrating a temperature sensor according to a second embodiment.
Figure 8B:
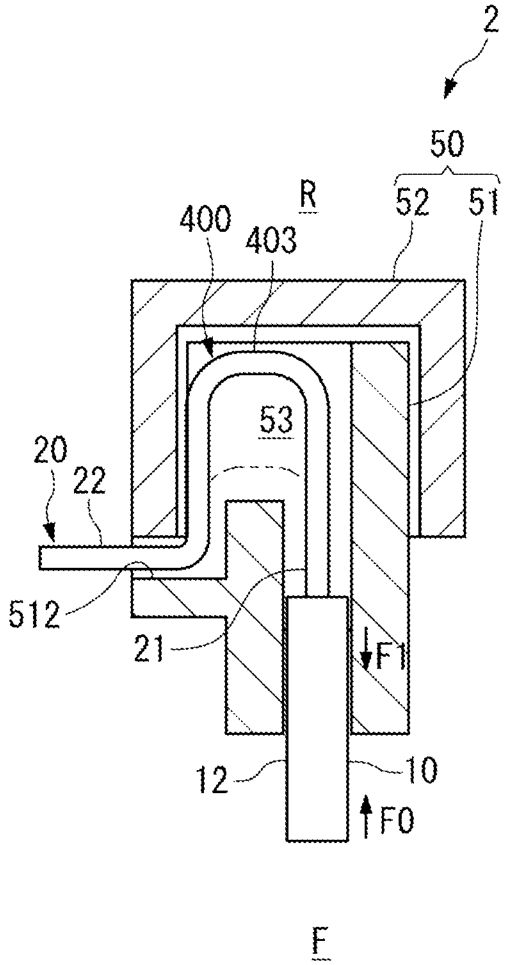

A temperature sensor 2 illustrated in FIGS. 8A and 8B includes the thermosensitive portion 10, the lead wires 20 that communicate with the thermosensitive portion 10 and each includes a bent region 400, and a holder 50 including a first holder 51 and a second holder 52.

As in the first embodiment, the second regions 22 of the lead wires 20 extend in the −y direction orthogonal to the first regions 21.

The bent regions 400 are curved to protrude in the +x direction. A tube as a rigidity adding member may be provided in a range including at least curved portions 403 of the bent regions 400 as necessary.

At least the bent regions 400 of the lead wires 20 are housed in a space 53 inside the first holder 51 and the second holder 52. The second regions 22 are drawn out to the outside of the holder 50 through a gap 512 between the first holder 51 and the second holder 52. The bent regions 400 are held against the load F0 generated by pressing the thermosensitive portion 10 toward the bent regions 400, by the second holder 52 holding the second regions 22.

The bent regions 400 are elastically deformed rearward as illustrated in FIG. 8B from the initial state A1 illustrated in FIG. 8A by the load F0 generated by pressing the thermosensitive portion 10 to the rear side R. As the bent regions 400 elastically deforms, the thermosensitive portion 10 is displaced to the rear side R relative to the holder 50.

Third Embodiment

Figure 9A:
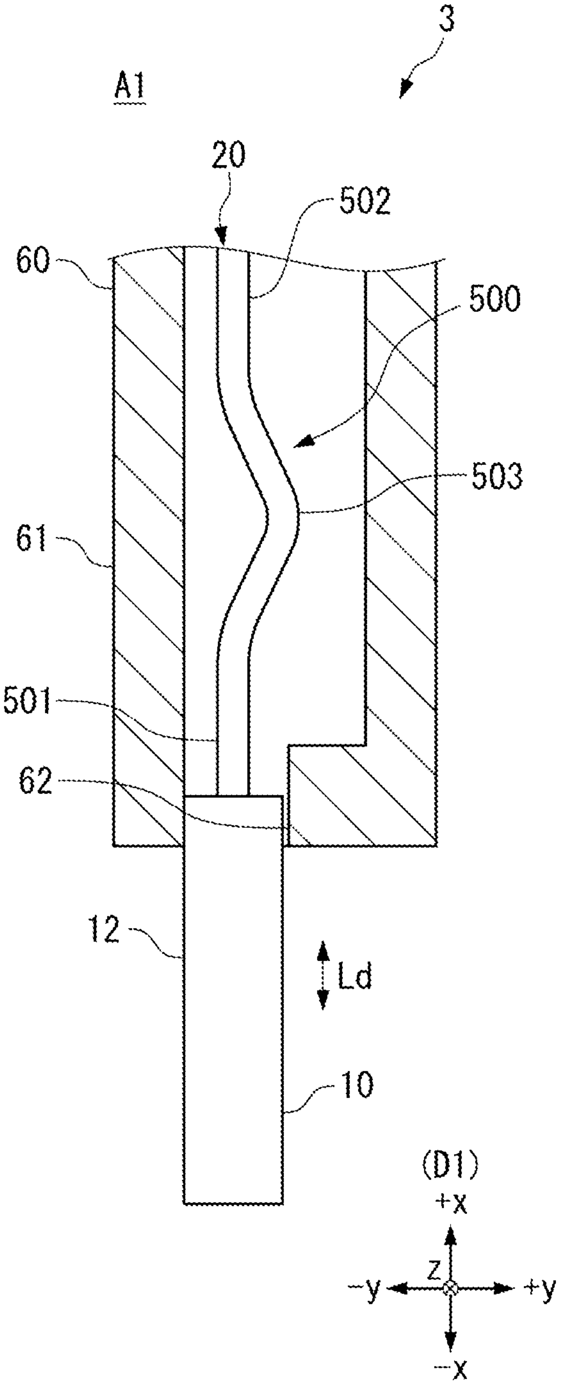
FIGS. 9A and 9B are schematic views illustrating a temperature sensor according to a third embodiment.
Figure 9B:
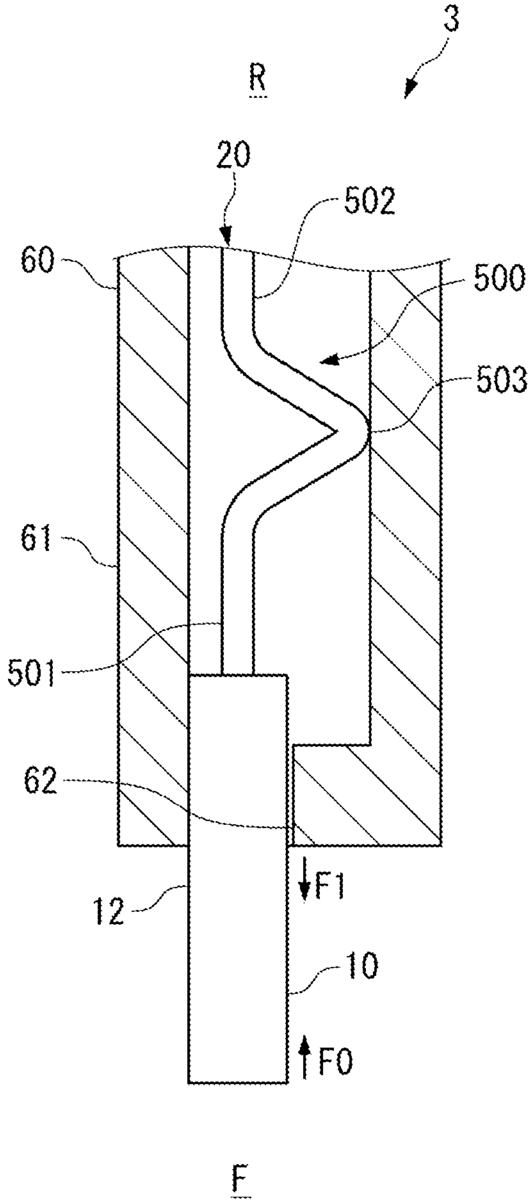

A temperature sensor 3 illustrated in FIGS. 9A and 9B includes the thermosensitive portion 10, the lead wires 20 that communicate with the thermosensitive portion 10 and each includes a bent region 500, and a holder 60 including a cylindrical housing portion 61.

Each of the lead wires 20 includes, in addition to the bent region 500, a first region 501 extending from the thermosensitive portion 10 to the bent region 500, and a second region 502 extending from the bent region 500 and drawn out to the outside of the holder 30. The second regions 502 according to the third embodiment are drawn out in the direction same as the x direction in which the first regions 501 extend.

The bent regions 500 are formed in bent shapes protruding in the +y direction. A tube as a rigidity adding member may be provided in a range including at least bent portions 503 of the bent regions 500 as necessary.

At least the bent regions 500 of the lead wires 20 are housed in the housing portion 61 of the holder 60. The bent regions 500 are held against the load F0 generated by pressing the thermosensitive portion 10 toward the bent regions 500, by an unillustrated holding portion provided on the holder 60.

The bent regions 500 are elastically deformed rearward as illustrated in FIG. 9B from the initial state A1 illustrated in FIG. 9A by the load F0 generated by pressing the thermosensitive portion 10 to the rear side R. As the bent regions 500 elastically deforms, the thermosensitive portion 10 is displaced to the rear side R relative to the holder 60. The thermosensitive portion 10 is displaced in the one direction D1 along a guide wall 62 surrounding the thermosensitive portion 10, and is drawn into the holder 60.

Fourth Embodiment

Figure 10A:
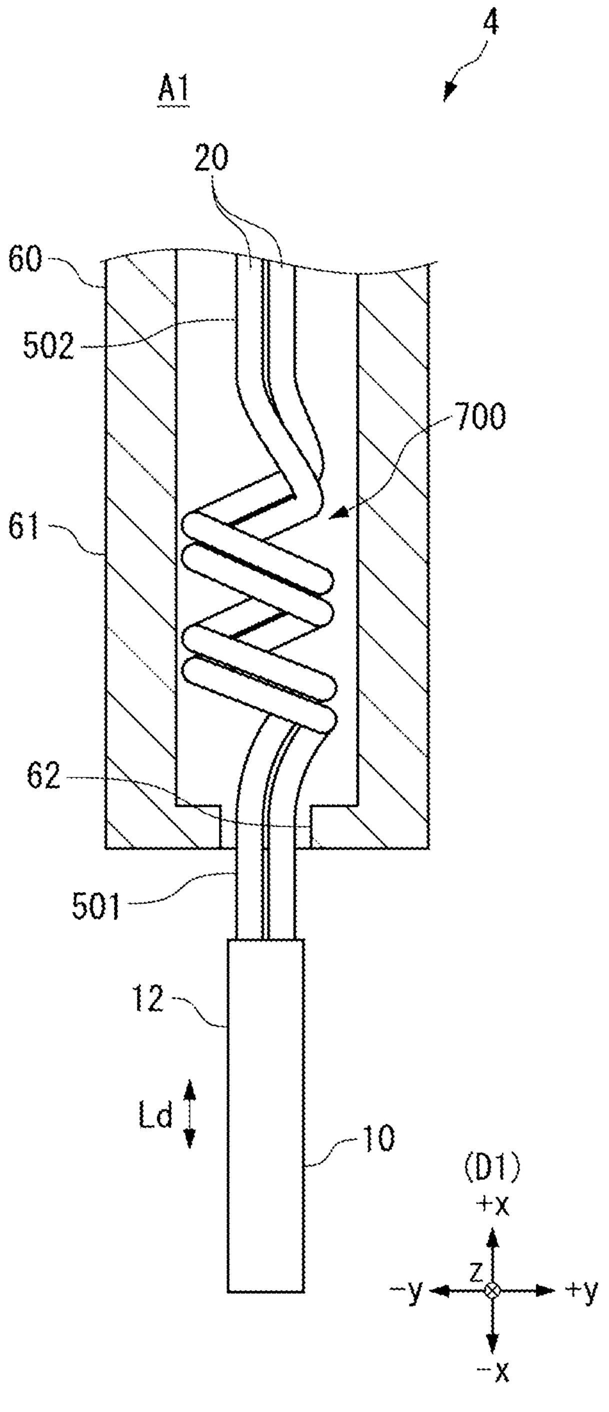
FIGS. 10A and 10B are schematic views illustrating a temperature sensor according to a fourth embodiment.
Figure 10B:
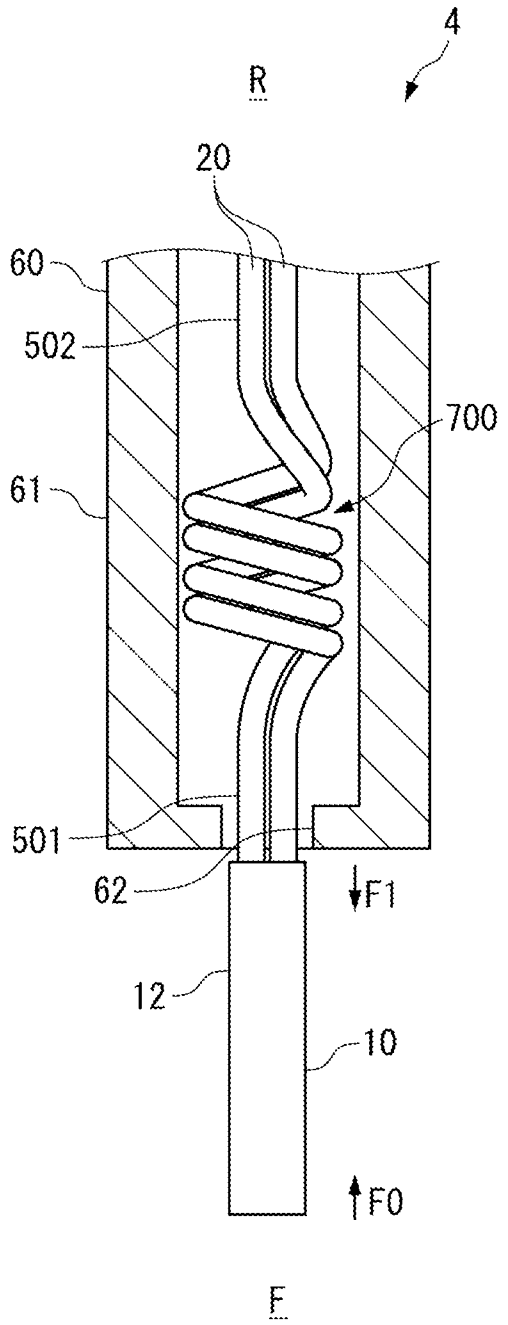

A temperature sensor 4 illustrated in FIGS. 10A and 10B includes the thermosensitive portion 10, the lead wires 20 communicating with the thermosensitive portion 10, and the holder 60 including the housing portion 61 in which bent regions 700 are housed. Each of the lead wires 20 includes the bent region 700, the first region 501, and the second region 502.

The bent regions 700 are formed in coil spring shapes. Axes of the bent regions 700 are set in the x direction. The bent regions 700 are held against the load F0 generated by pressing the thermosensitive portion 10 toward the bent regions 500, by an unillustrated holding portion provided on the holder 60.

A tube as a rigidity adding member can be provided on the bent regions 700 as necessary.

The bent regions 700 are elastically deformed rearward as illustrated in FIG. 10B from the initial state A1 illustrated in FIG. 10A by the load F0 generated by pressing the thermosensitive portion 10 to the rear side R. Along with elastic deformation of the bent regions 700, the thermosensitive portion 10 is drawn into the holder 60.

Other than the above description, the configurations described in the above-described embodiments can be selected, or can be appropriately changed to another configuration without departing from the spirit of the present invention.

The temperature sensor according to the present invention is applicable to various products in which positional adjustment of the thermosensitive portion 10 matching with the position of the temperature measurement object 9 is helpful because the thermosensitive portion 10 is held by the lead wires 20 so as to be displaceable at least in the one direction D1 relative to the holder 30. An example of the products is a cooking tool such as a cooking stove and a rice cooker. When the bent regions 200 are elastically deformed downward by the load F0 generated when a cooking pot or an inner cooking pan of the rice cooker presses the thermosensitive portion 10 downward, the thermosensitive portion 10 can be stably brought into contact with a bottom of the pot or the pan (temperature measurement object).

In the present invention, parts of the lead wires 20 held inside the holder 30 may linearly extend as long as the thermosensitive portion 10 is held by the lead wires 20 so as to be displaceable at least in the one direction D1 relative to the holder 30.

The tube 25 as a rigidity adding portion may be provided not only on the bent regions 200 but also on other portions necessary for securing rigidity. For example, a tube may be provided on the first sections 211 and the second sections 212. For example, in a case where the thermosensitive portion 10 is displaced to the rear side R and buckling may occur on the first sections 211 of the lead wires 20, an additional tube 27 (not illustrated) as a rigidity adding portion is preferably provided. The additional tube 27 can improve rigidity of corresponding portions, as with the tube 25. However, the tube 25 is based on the premise of being elastically deformed, whereas the additional tube is provided to prevent occurrence of elastic deformation. The additional tube can also be provided on the first sections 211. In this example, the tube 25 and the additional tube are separately provided; however, the tube 25 and the additional tube can also be integrated.

Supplement

According to the above-described disclosure, the following configurations can be grasped.

(1) A temperature sensor, including:
- a thermosensitive portion including a thermosensitive element and a covering body made of a resin and covering the thermosensitive element;
- an electric wire electrically connected to the thermosensitive element and drawn out from the covering body in one direction; and
- a holder configured to house and hold a part of the electric wire in an inside of the holder, in which
- the thermosensitive portion is held by the electric wire to be displaceable at least in the one direction relative to the holder.

(2) The temperature sensor according to item (1), in which the part of the electric wire includes a bent region in a bent state.

(3) The temperature sensor according to item (21) or (32), in which the bent region presses the thermosensitive portion against a temperature measurement object as the bent region elastically deforms.

(4) The temperature sensor according to any one of items (1) to (3), in which the covering body is formed in a long shape extending in the one direction.

(5) The temperature sensor according to any one of items (2) to (4), further including a rigidity adding portion provided around at least the bent region of the electric wire, the rigidity adding portion being provided on at least the bent region.

(6) The temperature sensor according to item (5), in which
- the electric wire includes a first region extending from the thermosensitive portion to the bent region, and a second region extending from the bent region and drawn out to an outside of the holder,
- the rigidity adding portion includes an end on a side close to the first region and an end on a side close to the second region, the ends being positioned in the inside of the holder, and
- the end on the side close to the second region is locked to the holder from the inside, to regulate displacement of the bent region to the outside of the holder.

(7) The temperature sensor according to any one of items (2) to (6), in which
the electric wire includes a first region extending from the thermosensitive portion to the bent region, and a second region extending from the bent region and drawn out to an outside of the holder, and
the second region extends in a direction orthogonal to the first region.

(8) The temperature sensor according to any one of items (2) to (7), in which,
the electric wire includes a first region extending from the thermosensitive portion to the bent region, and a second region extending from the bent region and drawn out to an outside of the holder, and
the holder includes a guide portion configured to guide the first region in the one direction when the bent region is deformed.

(9) The temperature sensor according to any one of items (2) to (8), in which the holder includes a first holder including an opening into which the thermosensitive portion and the bent region are inserted and configured to house the bent region, and a second holder configured to close the opening and to receive the bent region against force pressing the thermosensitive portion toward the bent region in the one direction.

(10) The temperature sensor according to any one of items (1) to (9), in which the thermosensitive portion is displaceable in the one direction by elastic deformation of the electric wire.

(11) The temperature sensor according to item (10), in which the thermosensitive portion is pressed against the temperature measurement object by stress generated in the electric wire by the elastic deformation.

(12) A rotary electric machine, including:
a stator including a core and a coil;
a rotor configured to rotate relative to the stator; and
the temperature sensor according to any one of items (1) to (11), the temperature sensor being configured to detect a temperature of the coil.

REFERENCE SIGNS LIST

1 to 4 Temperature sensor
9 Temperature measurement object
9A Surface
10 Thermosensitive portion
11 Thermosensitive element
12 Covering body
12B Rear end
13 Joint portion
20 Lead wire (electric wire)
20A Core wire
20B Insulation coating
21 First region
22 Second region
25, 25A, 25B, 25C Tube (rigidity adding portion)
25F, 25R Portion
26 Tape-like member
30 Holder
31 First holder
32 Second holder
33 Space
50 Holder
51 First holder
52 Second holder
53 Space
60 Holder
61 Housing portion
62 Guide wall
111 Thermosensitive body
112 Sealing material
113 Clad wire (extraction wire)
121 First region
121A Front end part
122 Second region
200 Bent region
201 First facing portion
202 Second facing portion
203 Curved portion
203F Front end
203R Rear end
211 First section
212 Second section
251, 252 End part
310 Housing portion
310A, 310B Side wall
310C Bottom
310D, 310E Wall
310F Notch
311 Opening
312 Guide portion
312A Wall
312B Wall
312F Front end
313 Lead wire insertion portion
321 Opening
322 Side wall
323 Top wall
324 Notch
400 Bent region
403 Curved portion
500 Bent region
501 First region
502 Second region
503 Bent portion
700 Bent region
A1 Initial state
B Bent part
D1 One direction
F Front side
F0, F1 Load
Ld Longitudinal direction
P0 Reference position
R Rear side
m Tolerance
t Thickness
w Width
xd Displacement amount

The invention claimed is:

1. A temperature sensor, comprising:
a thermosensitive portion including a thermosensitive element and a covering body made of a resin and covering the thermosensitive element;
an electric wire electrically connected to the thermosensitive element and drawn out from the covering body in one direction; and
a holder configured to house and hold a part of the electric wire in an inside of the holder; wherein
the thermosensitive portion is held by the electric wire to be displaceable at least in the one direction relative to the holder,
the part of the electric wire includes a bent region in a bent state, and the bent region presses the thermosensitive portion against a temperature measurement object as the bent region elastically deforms.

2. The temperature sensor according to claim 1, wherein the covering body is formed in a long shape extending in the one direction.

3. The temperature sensor according to claim 1, further comprising a rigidity adding portion provided around at least the bent region of the electric wire.

4. The temperature sensor according to claim 1, wherein the electric wire includes a first region extending from the thermosensitive portion to the bent region, and a second region extending from the bent region and drawn out to an outside of the holder, and the second region extends in a direction orthogonal to the first region.

5. The temperature sensor according to claim 1, wherein the electric wire includes a first region extending from the thermosensitive portion to the bent region, and a second region extending from the bent region and drawn out to an outside of the holder, and the holder includes a guide portion configured to guide the first region in the one direction when the bent region is deformed.

6. The temperature sensor according to claim 1, wherein the holder includes a first holder including an opening into which the thermosensitive portion and the bent region are inserted and configured to house the bent region, and a second holder configured to close the opening and to receive the bent region against force pressing the thermosensitive portion toward the bent region in the one direction.

7. A temperature sensor, comprising:

a thermosensitive portion including a thermosensitive element and a covering body made of a resin and covering the thermosensitive element;

an electric wire electrically connected to the thermosensitive element and drawn out from the covering body in one direction; and a holder configured to house and hold a part of the electric wire in an inside of the holder; wherein the thermosensitive portion is held by the electric wire to be displaceable at least in the one direction relative to the holder, and the part of the electric wire includes a bent region in a bent state, wherein a rigidity adding portion is provided around at least the bent region of the electric wire and, wherein the electric wire includes a first region extending from the thermosensitive portion to the bent region, and a second region extending from the bent region and drawn out to an outside of the holder, the rigidity adding portion includes an end on a side close to the first region and an end on a side close to the second region, the ends being positioned in the inside of the holder, and the end on the side close to the second region is locked to the holder from the inside, to regulate displacement of the bent region to the outside of the holder.

8. A temperature sensor, comprising: a thermosensitive portion including a thermosensitive element and a covering body made of a resin and covering the thermosensitive element;

an electric wire electrically connected to the thermosensitive element and drawn out from the covering body in one direction; and a holder configured to house and hold a part of the electric wire in an inside of the holder, wherein the thermosensitive portion is held by the electric wire to be displaceable at least in the one direction relative to the holder, and the thermosensitive portion is displaceable in the one direction due to elastic deformation of a bent region formed in a part of the electric wire.

9. The temperature sensor according to claim 8, wherein the thermosensitive portion is pressed against a temperature measurement object by stress generated in the electric wire by the elastic deformation.

10. A rotary electric machine, comprising:

a stator including a core and a coil;

a rotor configured to rotate relative to the stator; and a temperature sensor, comprising:

a thermosensitive portion including a thermosensitive element and a covering body made of a resin and covering the thermosensitive element;

an electric wire electrically connected to the thermosensitive element and drawn out from the covering body in one direction; and a holder configured to house and hold a part of the electric wire in an inside of the holder, wherein the thermosensitive portion is held by the electric wire to be displaceable at least in the one direction relative to the holder due to elastic deformation of a bent region formed in a part of the electric wire, and the temperature sensor is configured to detect a temperature of the coil.

* * * * *